UNITED STATES PATENT OFFICE.

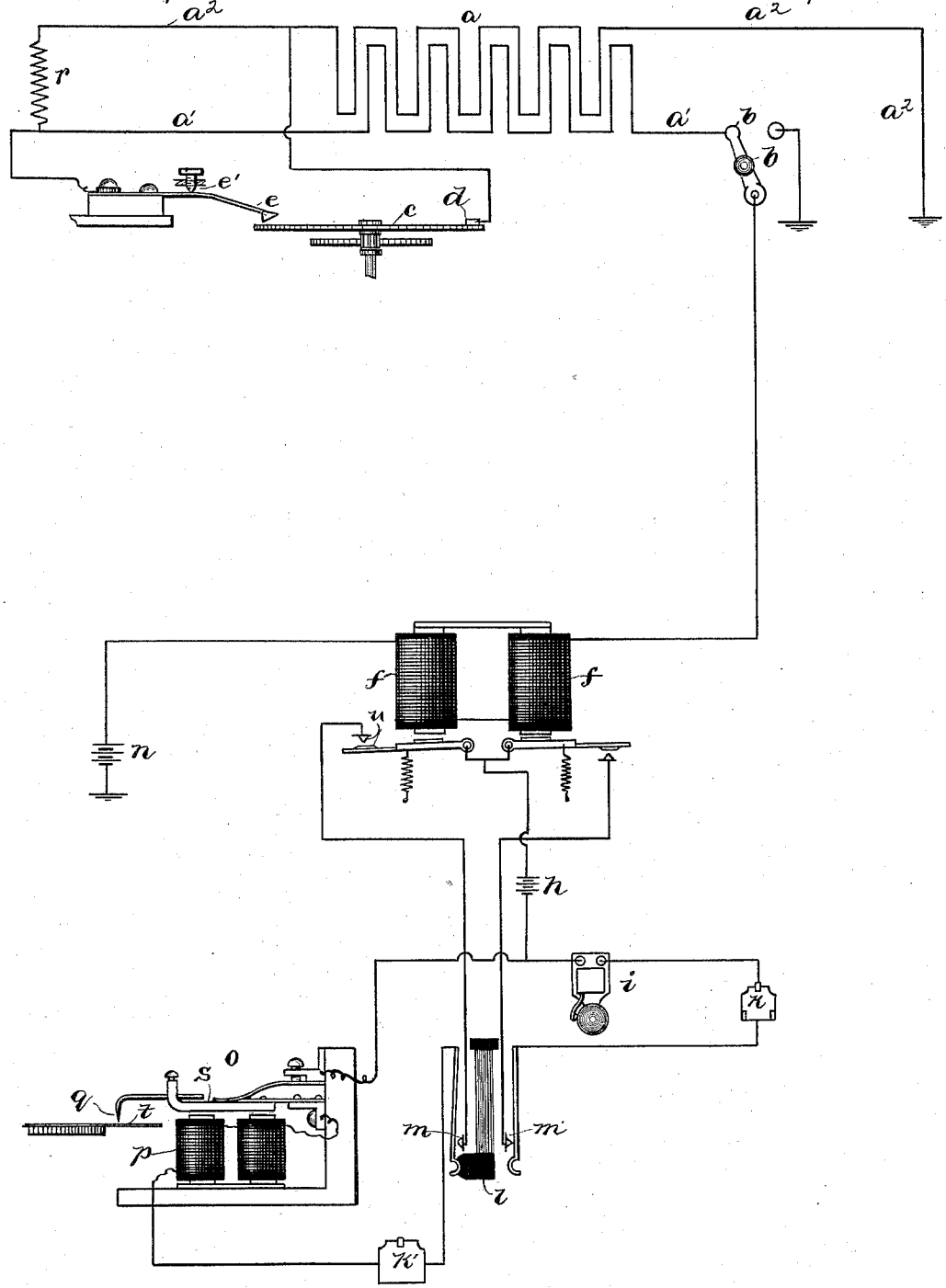

ALFRED STROMBERG, OF CHICAGO, ILLINOIS, ASSIGNOR OF ONE-HALF TO MARK SIMONS, OF SAME PLACE.

AUTOMATIC TEST FOR BURGLAR-ALARM SYSTEMS.

SPECIFICATION forming part of Letters Patent No. 477,712, dated June 28, 1892.

Application filed March 17, 1892. Serial No. 425,268. (No model.)

*To all whom it may concern:*

Be it known that I, ALFRED STROMBERG, a citizen of the United States, residing at Chicago, in the county of Cook and State of Illinois, have invented a certain new and useful Improvement in Automatic Tests for Burglar-Alarm Systems, (Case No. 3,) of which the following is a full, clear, concise, and exact description, reference being had to the accompanying drawing, forming a part of this specification.

My invention relates to burglar-alarm systems, especially to that class of burglar-alarm systems in which districts located in various places are connected with recording devices at the central office for the purpose of receiving signals when the circuit is opened or crossed with another circuit in said district.

The object of my invention is to automatically at stated periods test the condition of the circuit, thus saving the time which it has been customary to expend in making special tests when it is desired to ascertain in what condition the circuit is, and at the same time to have this test made more frequently, as by my device it can be made, if desired, as often as every minute or oftener. I preferably, however, make the test only once in ten minutes, as I have found in practice that this is frequent enough to serve the purpose.

In the accompanying drawing, which illustrates my invention, I have shown the circuits and apparatus which I use in diagrammatic form, not deeming it necessary to fully illustrate the clock-work mechanism which I use, this being simply an ordinary clock-movement.

In a previous application of mine for a patent, Serial No. 425,030, filed March 15, 1892, I have described the circuits and apparatus which I use for the protection of openings and exposed points of buildings, safes, &c. My present invention is specially applicable to the circuits and apparatus described in said application; but I do not wish to limit myself to its use in that connection, as it is applicable also to other arrangements of circuits and apparatus.

The protected district $a$ is represented diagrammatically. Two wires $a'$ $a^2$ run throughout the circuit, and a resistance $r$ is connected in branch circuit between them. The switch $b$ serves to disconnect circuit $a'$, which leads to the central office, when the district to be protected is connected for operation. The circuit $a^2$ runs directly to ground. The central-office apparatus and circuits are described in my previous application already referred to and need not be further described here, except so far as relates to the special features which are added to accomplish the purpose of my invention.

The wheel or disk $c$ is connected in any suitable way with the clock-work or other suitable motor mechanism and is arranged to rotate at any desired rate of speed. A metallic projection $d$ upon the surface of the said wheel is arranged to come into contact with a contact-spring $e$, which is made adjustable with relation to said wheel $c$ by means of the adjusting-screw $e'$. The wheel $c$ is connected with the district wire $a^2$ and the contact-spring with district wire $a'$, so that when said contact-spring comes in contact with the projection $d$ a short circuit between said two district wires is established, shunting out resistance $r$. When the switch-lever $b$ is on contact-point $b'$, as shown in the drawing, the circuit $a'$ is connected with the central-office apparatus, which consists of two relays $ff$, so adjusted that any interference with the district circuits which results in either opening, crossing, or grounding them will result in closing a local circuit in the office, in which is included local battery $h$, bell $i$, and shutter-drop $k$. The switch $l$ is placed in this local circuit and is adapted to open either contact $m$ $m'$ or to leave both contacts closed, as may be desired. All the central-office apparatus and circuits before mentioned, including the main battery $n$, which is connected to ground, accomplish results the same as shown in my application hereinbefore referred to; but to respond to the test-signals transmitted by the closing of the branch circuit, including the wheel $c$ and contact-spring $e$, as already set forth, I include in the said office local circuit in series with the bell $i$ and shutter-drop $k$ an auxiliary shutter-drop $k'$ and the recording device $o$.

The recording device $o$ consists of an electro-magnet $p$, with a point $q$, connected with its armature $s$, which armature is pivoted or hung by a torsional spring in such manner that upon the attraction of the armature the point $q$ is pressed upon the dial $t$, which is made of paper and preferably marked off into sections representing divisions of time. This dial is made to rotate by clock mechanism or by any other motor mechanism in any suitable manner and need not be further described. By having this dial marked off into concentric circles and arranging several pointers $q$ to strike each within a different circle I can use the same dial for many test-recording devices.

The auxiliary shutter-drop $k'$ gives a visual signal each time a test-signal is received and is intended for the convenience of the operator, the dial being adapted for a permanent record, the paper of which the dial is made being removable and adapted to be replaced when a complete revolution of the dial is made. The auxiliary shutter-drop $k'$ may be made to be reset automatically by clock-work, if desired; but that arrangement is not an essential feature of this invention and need not be further described.

It will be readily seen that upon the shunting out of resistance $r$ by the closing of the branch circuit through wheel $c$ and contact-spring $e$ the local-office circuit will be closed through relay contact-points $u$, and contact-points $m\ m'$ being closed the armatures of the test-recording device will be attracted, thus bringing the pointer $q$ against the paper dial and making therein a perforation. At the same time the shutter-drop $k'$ is thrown down, giving visual notice that the test-signal has been received. As soon as the contact between the wheel $c$ and the contact-spring $e$ has been broken by the passing on of the projection $d$ in its periodical rotation the local circuit will be opened and the apparatus will resume its normal position ready to receive another signal.

During the time that the test-signal is being received any tampering with the district conductors which results in opening or grounding them will result in sending a signal to the central office, which will be indicated by the shutter-drop $k$ and the bell $i$. Thus the automatic test does not interfere even for the few seconds during which it is in operation with the efficiency of the protection of the system.

Having thus described my invention, what I claim as new, and desire to secure by Letters Patent, is—

1. In an automatic alarm system, the combination, with a normally-closed metallic circuit through the district to be protected, of a resistance connected between the two sides of said metallic circuit, a periodical contact-closing mechanism adapted to temporarily short-circuit said resistance, central-office apparatus adapted to respond to changes of the condition of the district circuit resulting from the opening, grounding, or crossing of the circuit through said district, and recording apparatus adapted to respond only upon the operation of the periodical contact-closing mechanism, substantially as described.

2. In combination, the double circuit $a'\ a^2$, the resistance $r$ in branch thereof, the rotating wheel $c$, and the adjustable contact-spring $e$, the conducting-wire $a'$, a double relay adapted to close a local circuit at the office whenever said circuit-wires $a'\ a^2$ are crossed, grounded, or opened, the switch $l$, shutter-drop $k$, bell $i$, test-responding device $o$, and auxiliary shutter-drop $k'$, substantially as and for the purpose specified.

In witness whereof I hereunto subscribe my name this 14th day of March, A. D. 1892.

ALFRED STROMBERG.

Witnesses:
GEORGE L. CRAGG,
GEORGE McMAHON.